(12) United States Patent
Ciocca

(10) Patent No.: US 12,495,091 B2
(45) Date of Patent: Dec. 9, 2025

(54) DEVICE WITH TIME STAMP SYNCHRONIZING AND RELATED METHOD

(71) Applicant: STMICROELECTRONICS, INC., Coppell, TX (US)

(72) Inventor: Denis Ciocca, Santa Clara, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 450 days.

(21) Appl. No.: 17/953,848

(22) Filed: Sep. 27, 2022

(65) Prior Publication Data

US 2023/0102907 A1   Mar. 30, 2023

Related U.S. Application Data

(60) Provisional application No. 63/250,664, filed on Sep. 30, 2021.

(51) Int. Cl.
 *G06F 15/16* (2006.01)
 *H04L 67/1095* (2022.01)
 *H04L 67/12* (2022.01)

(52) U.S. Cl.
 CPC .......... *H04L 67/12* (2013.01); *H04L 67/1095* (2013.01)

(58) Field of Classification Search
 CPC .......................... H04L 67/12; H04L 67/1095
 See application file for complete search history.

(56) References Cited

U.S. PATENT DOCUMENTS

| | | |
|---|---|---|
| 4,426,624 A | 1/1984 | Beauducel et al. |
| 7,085,681 B1 | 8/2006 | Williams et al. |
| 7,551,647 B2 | 6/2009 | Fellman et al. |
| 8,102,787 B2 | 1/2012 | Wang et al. |
| 8,654,758 B2 | 2/2014 | Zakrzewski et al. |
| 8,843,684 B2 | 9/2014 | Jones et al. |
| 8,873,589 B2 | 10/2014 | Aweya et al. |
| 8,959,381 B2 | 2/2015 | Aweya et al. |

(Continued)

FOREIGN PATENT DOCUMENTS

| | | |
|---|---|---|
| EP | 3043478 A1 | 7/2016 |
| WO | WO 2004099801 A1 | 11/2004 |
| WO | WO 2017070593 A2 | 4/2017 |

OTHER PUBLICATIONS

Brahmi et al., "Timestamping and Latency Analysis for Multi-Sensor Perception Systems," 2013 IEEE Sensors, Baltimore, MD, Nov. 3-6, 2013, 5 pages.

*Primary Examiner* — Normin Abedin
(74) *Attorney, Agent, or Firm* — Seed Intellectual Property Law Group LLP

(57) ABSTRACT

A device includes processing circuitry and sensor communication interface circuitry. The processing circuitry, in operation, generates one or more parameters of a regression model based on a plurality of data sets. Each data set includes an application time stamp and a sensor time stamp. Based on the one or more parameters, the processing circuitry estimates application time stamps associated with received sensor data samples. The received sensor data samples have associated sensor time stamps. The sensor communication interface circuitry is coupled to the processing circuitry. The sensor communication interface circuitry, in operation, communicatively couples the processing circuitry to a sensor. Data samples of the sensor are received by the processor via the sensor communication interface circuitry.

29 Claims, 8 Drawing Sheets

(56) References Cited

U.S. PATENT DOCUMENTS

| | | |
|---|---|---|
| 9,075,545 B2 | 7/2015 | Etkin et al. |
| 9,939,838 B1 | 4/2018 | Gao et al. |
| 10,863,469 B2 | 12/2020 | Chung et al. |
| 11,038,609 B2 | 6/2021 | Matsunaga et al. |
| 11,063,738 B1 | 7/2021 | Wang |
| 11,849,016 B1 * | 12/2023 | Wang .................. H04L 43/0858 |
| 2015/0281809 A1 | 10/2015 | Foster, III |
| 2016/0323565 A1 | 11/2016 | van Baarsen et al. |
| 2018/0091290 A1 | 3/2018 | Li |
| 2018/0224887 A1 | 8/2018 | Pitigoi-Aron |
| 2019/0020433 A1 * | 1/2019 | Pitigoi-Aron ....... H04W 56/001 |
| 2019/0331493 A1 | 10/2019 | Bellusci et al. |
| 2021/0191755 A1 | 6/2021 | Sayed et al. |

\* cited by examiner

DEVICE WITH TIME STAMP SYNCHRONIZING AND RELATED METHOD

BACKGROUND

Technical Field

The present disclosure is related to time stamp synchronization, and more particularly, but not exclusively, to the generation of application time stamps associated with sensor time stamps.

Description of the Related Art

In various devices and applications, data received from multiple sensors (e.g., accelerometer, gyroscope, magnetometer, radar, time-of-flight, photographic, location/navigation and/or videographic, and others) may be combined in order to provide more sophisticated functions. For example, mobile devices, automobiles and virtual reality systems may include image stabilization subsystems (e.g., Optical Image Stabilization and/or Electronic Image Stabilization) that utilize synchronized data from multiple sensors.

Some sensors are capable of internally time stamping data, and use an internal clock generator as a time base clock. Such sensors use their own time domain for time stamping sensor data. When a processor or microcontroller unit (MCU) reads data from the sensors, sensor time stamps are remapped into application time stamps to coordinate data samples.

BRIEF SUMMARY

The inventors have realized that, due to different time domains (e.g., clock sources), sensor time stamps drift from application time stamps. Over time, sensor time stamps read by the processor or MCU (or simply, "the processor") are considered to be in the far future or in the far past. As an increasing amount of sensor data from disparate sensors (e.g., camera, global navigation, time-of-flight, and accelerometer) is fused to provide more sophisticated functions, time stamp accuracy becomes increasingly beneficial.

The inventors have also realized that time stamp mapping and/or synchronization solutions that are based on interrupt service routines (ISRs) assume that data read operations are executed in a very low jitter system and in a very predictable manner. For example, an assumption may be made that execution of an ISR operation and a data read operation take the same amount of time. This assumption is generally untrue in an environment using an operating system (OS), which causes solutions based on ISR to be unsuitable for scaling to different system architectures, such as an OS kernel.

In an embodiment, a device includes processing circuitry and sensor communication interface circuitry. The processing circuitry, in operation, generates one or more parameters of a regression model based on a plurality of data sets. Each data set includes an application time stamp and a sensor time stamp. Based on the one or more parameters, the processing circuitry estimates application time stamps associated with received sensor data samples. The received sensor data samples have associated sensor time stamps. The sensor communication interface circuitry is coupled to the processing circuitry. The sensor communication interface circuitry, in operation, communicatively couples the processing circuitry to a sensor. Data samples of the sensor are received by the processor via the sensor communication interface circuitry. In one embodiment, the one or more parameters of the regression model are generated using fixed point arithmetic. In one embodiment, the one or more parameters of the regression model are generated using fixed point arithmetic.

In one embodiment, a method includes generating one or more parameters of a regression model based on a plurality of data sets. Each of the plurality of data sets includes a respective first application time stamp and a respective first sensor time stamp. A second application time stamp associated with a received sensor data sample is estimated based on the one or more parameters. The received sensor data sample has an associated second sensor time stamp. In one embodiment, the one or more parameters of the regression model are generated using fixed point arithmetic. In one embodiment, the one or more parameters of the regression model are generated using fixed point arithmetic.

In one embodiment, a system includes a plurality of sensors. Each of the plurality of sensors is associated with a respective sensor time domain. A processor is coupled to the plurality of sensors. The processor generates one or more parameters of a regression model based on a plurality of data sets. Each data set includes an application time stamp and a sensor time stamp. The processor estimates, based on the one or more parameters, application time stamps associated with received sensor data samples. The received sensor data samples have associated sensor time stamps. In one embodiment, the one or more parameters of the regression model are generated using fixed point arithmetic. In one embodiment, the one or more parameters of the regression model are generated using fixed point arithmetic.

In one embodiment, a non-transitory computer-readable medium has stored instructions thereon. When executed by one or more processors, the stored instructions cause the one or more processors to perform one or more automated operations. The automated operations include generating one or more parameters of a regression model based on a plurality of data sets. Each of the plurality of data sets including a respective first application time stamp and a respective first sensor time stamp. The automated operations include estimating, based on the one or more parameters, a second application time stamp associated with a received sensor data sample. The received sensor data sample has an associated second sensor time stamp. In one embodiment, the one or more parameters of the regression model are generated using fixed point arithmetic. In one embodiment, the one or more parameters of the regression model are generated using fixed point arithmetic.

In an embodiment, a system includes a sensor associated with a sensor time domain, and a processor coupled to the sensor. The sensor generates a data sample, generates a sensor time stamp associated with the sensor time domain, and associates the data sample with the sensor time stamp. The processor receives the data sample and the sensor time stamp from the sensor, and estimates, based on one or more parameters of a regression model and based on the sensor time stamp, an application time stamp associated with an application time domain. In one embodiment, the one or more parameters of the regression model are generated using fixed point arithmetic. In one embodiment, the one or more parameters of the regression model are generated using fixed point arithmetic.

BRIEF DESCRIPTION OF THE SEVERAL VIEWS OF THE DRAWINGS

Reference will now be made by way of example only to the accompanying drawings. In the drawings, identical reference numbers identify similar elements or acts, and reference numbers identical but for a different suffix identify similar elements or acts, unless the context indicates otherwise. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

Figure 1:
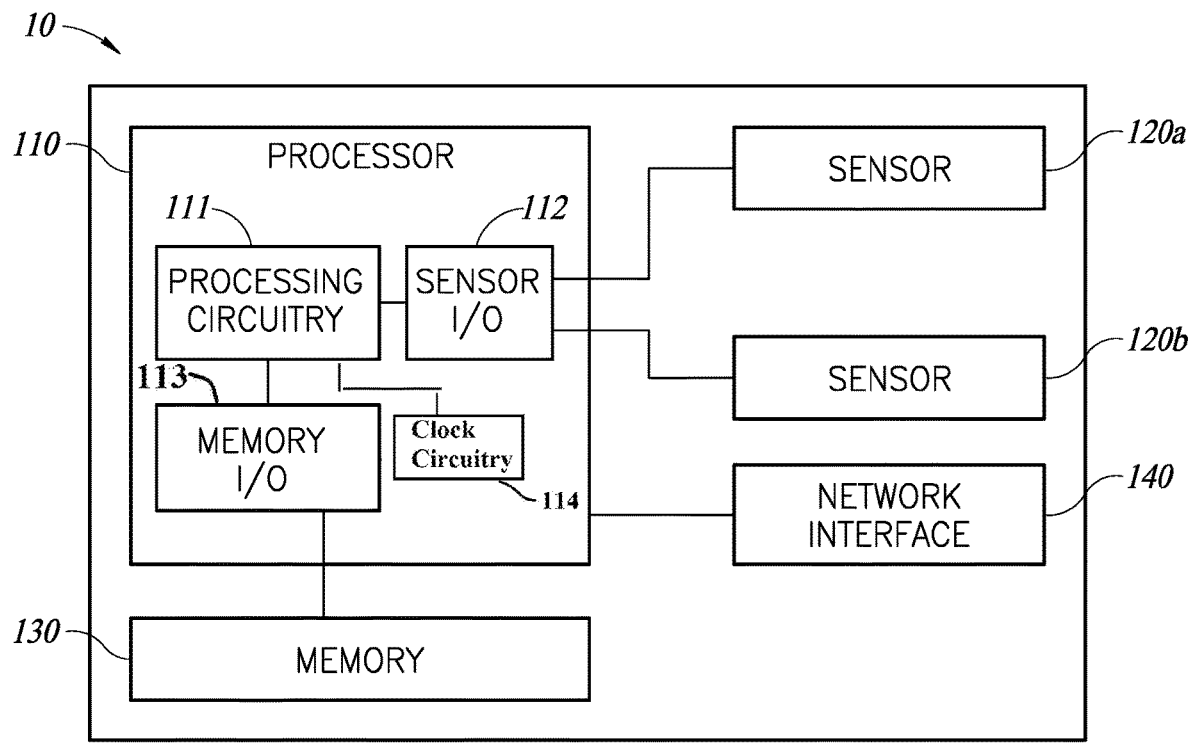
FIG. 1 is a schematic diagram of a system in accordance with various embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Sensor data samples from multiple sensors are integrated (or "fused") by a processor or MCU to provide more sophisticated functions. For example, an autonomous driving function of an automobile may be performed by integrating sensor data samples from multiple sensors, including cameras, accelerometers, global positioning/navigation receivers, radar sensors and ultrasonic sensors. One or more of the sensors may include respective onboard clock circuitry, which may set up multiple sensor time domains that are different from an application time domain on the processor.

For the sophisticated function to be performed accurately, the sensor data samples received from the various sensors are synchronized to the application time domain. More specifically, sensor time stamps associated with the data samples are remapped to application time stamps by the processor. When the processor runs an operating system, a significant delay may be present between a time when the data sample is associated with a sensor time stamp and a time when the processor receives the data sample and associated sensor time stamp. As such, the application time stamp associated with the received sensor time stamp is estimated by the processor. Drift between each sensor time domain and the application time domain may lead to increasingly inaccurate estimation of the application time stamp over time, which may degrade quality of integration of the sensor data samples, or even lead to failure of the sophisticated function.

Embodiments of the disclosure generate a regression model including one or more parameters, such as a slope and an intercept, for estimating the application time stamp from the sensor time stamp. The regression model is based on a plurality of data sets, each of which includes an application time stamp and a sensor time stamp. When the processor receives a sensor data sample and corresponding sensor time stamp, the processor estimates the application time stamp based on the one or more parameters of the regression model. The one or more parameters of the regression model are updated periodically to track any drift between the sensor time domain and the application time domain, which allows for sustained, accurate integration of the sensor data samples, and improved performance of the sophisticated function.

FIG. 1 illustrates a system 10 in accordance with various embodiments of the disclosure. The system 10 includes a processor 110 (or, "device 110"), sensors 120a, 120b, memory 130 and network interface 140. The system 10 may be an electronic system, or electronic control system, of an automobile, virtual reality hardware, augmented reality hardware or the like. The system 10 may provide one or more sophisticated functions that are based on integration, or fusion, by the processor 110 of time stamped data samples generated by the sensors 120a, 120b. In one embodiment, the system 10 provides an autonomous driving function of an automobile, or provides a headset tracking function of a virtual reality hardware or augmented reality hardware.

The processor 110 includes one or more of processing circuitry 111, a sensor communication interface (or "sensor communication interface circuitry") 112, a memory communication interface (or "memory communication interface circuitry") 113 and clock circuitry 114. The processor 110 may be a general purpose processor, a microprocessor unit, a microcontroller unit, a central processing unit or the like. The processor 110 integrates sensor data samples of the sensors 120a, 120b to provide the sophisticated functions.

The processing circuitry 111 may be or include an arithmetic logic unit, which may include one or more of adder circuitry, shift register circuitry, carry/rotate logic circuitry, clock circuitry, control circuitry and the like. The processing circuitry 111 may generate one or more parameters of a regression model based on a plurality of data sets. Each data set of the plurality of data sets may include a respective application time stamp and a respective sensor time stamp. The parameters of the regression model may include one or more of a slope and an intercept. Based on the one or more parameters, the processing circuitry 111 may estimate another application time stamp associated with a received sensor data sample. The processing circuitry 111 may estimate the another application time stamp based on a second sensor time stamp associated with the received sensor data sample by an equation, such as:

$$T_A = aT_S + b$$

where $T_A$ represents the another application time stamp, $T_S$ represents the second sensor time stamp, "a" represents the slope, and "b" represents the intercept. As an illustrative example, if the another application time stamp is the same as the second sensor time stamp, the slope "a" equals 1, and the intercept "b" equals 0. However, due to drift between clock circuitry of the processor 110 (e.g., the clock circuitry of the processing circuitry 111) and clock circuitry of the sensor 120a, the slope "a" may be greater or less than 1, indicating that the clock circuitry of the processor 110 lags or leads the clock circuitry of the sensor 120a, respectively. In one embodiment, the intercept is not calculated by the processor 110 (e.g., the intercept is assumed to be zero). Generally, the processor 110 (e.g., the processing circuitry 111) calculates respective one or more parameters of a plurality of regression models, each of the plurality of regression models corresponding to a respective sensor of the sensors 120a, 120b. Examples of generation of the one or more parameters of the regression model, and estimation of the application time stamp are described in greater detail with reference to FIGS. 4A-5E.

The sensors 120a, 120b may be collectively referred to as the sensors 120. The system 10 may include two sensors 120, as illustrated in FIG. 1. In one embodiment, the system 10 includes one sensor, such as the sensor 120a. In other embodiments, the system 10 includes more than two sensors 120, such as three sensors 120, four sensors 120, or an even larger number of sensors 120. The system 10 may include one or more different types of sensors 120. For example, the sensor 120a may be or include a camera, and the sensor 120b may be or include a camera (e.g., substantially the same as the sensor 120a) or a type of sensor that is different from the sensor 120a, such as an accelerometer, a navigation sensor, a time-of-flight sensor, a gyroscope, an inertial sensor, a humidity sensor, a compass, a microphone, a pressure sensor, a gas sensor, or the like. In one embodiment, the sensors 120 of the system 10 include a plurality of cameras, a plurality of accelerometers, a navigation sensor, a plurality of time-of-flight sensors, and other sensors. The sensors 120 may include micro-electro-mechanical systems (MEMS) sensors. Each of the sensors 120 generates data samples. For example, the data samples may include images, positional coordinates, depths or distances, temperature, pressure, humidity or the like.

The sensor communication interface circuitry 112 communicatively couples the processor 110 (e.g., the processing circuitry 111) to each of the sensors 120. Respective data samples of the sensors 120 are received by the processor 110 via the sensor communication interface circuitry 112. The sensor communication interface circuitry 112 may also be referred to as "a communication interface." In one embodiment, the sensor communication interface circuitry 112 is or includes a master-slave communication bus, such as an inter-integrated circuit (I²C or IIC) communication bus, serial peripheral interface (SPI) communication bus, or the like. In one embodiment, one or more of the sensors 120 is communicatively coupled to the processor 110 by the communication interface 112. The sensors 120 may be coupled to the processor 110 by a single communication interface 112, for example, by arranging the sensors 120 such that each of the sensors 120 is coupled (e.g., electrically connected) to a single communication bus.

Figure 2:
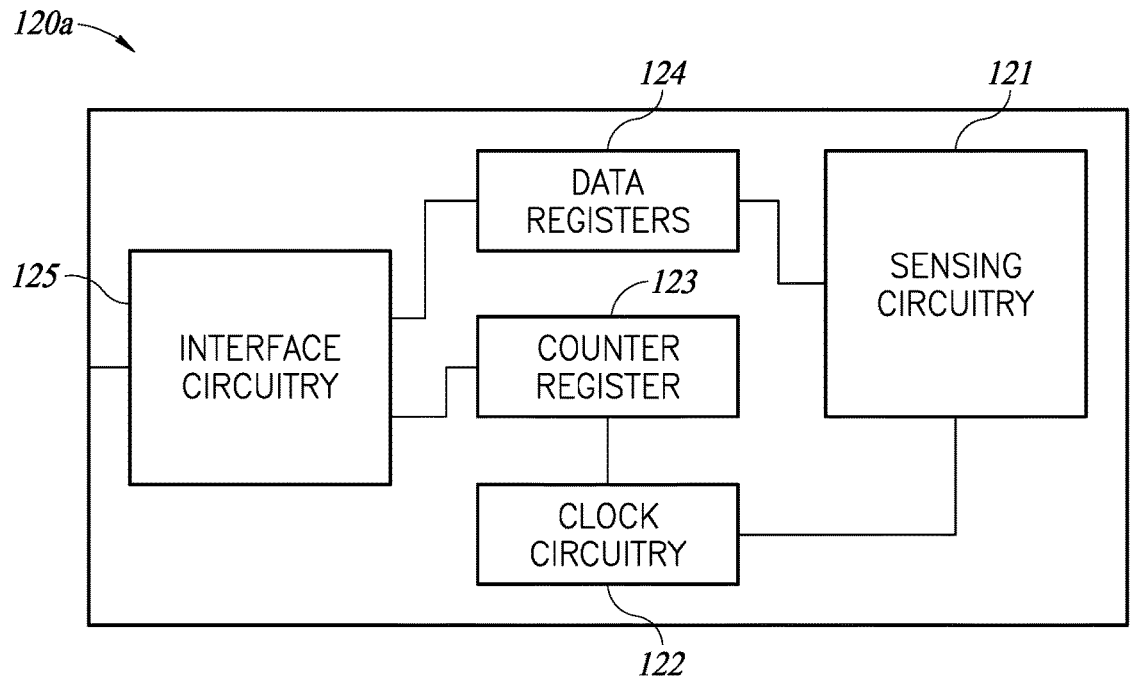
FIG. 2 is a schematic diagram of a sensor in accordance with various embodiments.

Each of the sensors 120 may include internal clock circuitry (e.g., clock circuitry 122 shown in FIG. 2). The respective internal clock circuitry of the sensors 120 may differ from the internal clock circuitry of the processor 110 (e.g., the clock circuitry 114 of the processor 110). In one embodiment, the respective internal clock circuitry of the sensors 120 is independent of the internal clock circuitry of the processor 110.

One or more applications run on the processor 110 may have respective application time stamps associated thereto. For example, the clock circuitry 114 of the processor 110 may include a counter. The counter may increment based on (e.g., in time with and driven by) a clock source, such as a ring oscillator, inductive-capacitive (LC) tank, a crystal oscillator or the like. An output of the counter may be latched as a time stamp in a register of the processor 110, the memory 130, or external to the system 10. The processing circuitry 111 may read the time stamp generated by the clock circuitry 114 of the processor 110. An "application time stamp" may be the time stamp generated by the clock circuitry 114 and associated with an application running on the processor 110.

The internal clock circuitry of the sensor 120a is described herein as an illustrative example. The internal clock circuitry of the sensor 120a may be in communication with a register (e.g., a counter register 123 shown in FIG. 2). A sensor time stamp may be stored in the register, and incremented by the internal clock circuitry of the sensor 120a. In one embodiment, the register is internal to the sensor 120a, such as is shown in FIG. 2, where the counter register 123 is included in the sensor 120a. In another embodiment, the register is located in the memory 130 of the system 10. In other embodiments, the register may be external to the system 10. The sensor time stamp stored in the register is incremented synchronous with the internal clock circuitry of the sensor 120a.

The processing circuitry 111 may generate the plurality of data sets used in generating the one or more parameters of the regression model. The processing circuitry 111 may receive the sensor time stamp from the sensor 120a. As described above, the sensor time stamp may reside in a register that may be internal to the sensor 120a or external to the sensor 120a, such as in the memory 130 or in an external memory to the system 10. In one embodiment, the processing circuitry 111 receives the sensor time stamp by reading the register. The processing circuitry 111 may read the register through the sensor communication interface circuitry 112 in the case of the register internal to the sensor 120a, or through the memory communication interface circuitry 113 in the case of the register residing in the memory 130. In one embodiment, the register in which the sensor timestamp resides is external to the system 10, and the processing circuitry 111 may read the register through the network interface 140, which may be network interface circuitry, and may be referred to as network interface circuitry. The network interface circuitry 140 may include one or more of electrical elements and optical elements, for example, arranged as an Ethernet interface.

The processing circuitry 111 may receive a sensor time stamp from the sensor 120a as part of a data packet including an associated sensor data sample. The sensor time stamp received as part of the data packet may be used by the processing circuitry 111 to estimate the application time stamp by the one or more parameters of the regression model, as described above. The sensor time stamp associated with the sensor data sample may drift relative to an application time stamp that is incremented synchronous with the internal clock circuitry of the processor 110. When the processor 110 runs an operating system, the application time stamp of the processor 110 may have a value that is much later than the sensor time stamp associated with sensor data sample, for example, when the processor 110 is delayed in retrieving the data packet. The processor 110 may be delayed in retrieving the data packet due to prioritizing other processing tasks ahead of the retrieval of the data packet. The delay between the sensor time stamping associated with the sensor data sample and the processor 110 retrieving the data packet from the sensor 120*a* may be so great as to render the application time stamp at the time of retrieval of the data packet substantially irrelevant. As such, the processing circuitry 111 uses the regression model to estimate an application time stamp that corresponds to the sensor time stamp, as described above. In a sense, the processing circuitry 111 looks back in time to when the sensor time stamp was associated with the sensor data sample, and re-creates (or, estimates) the value of the application time stamp that would have been present when the sensor time stamp was associated with the sensor data sample.

FIG. 2 illustrates a detailed schematic view of the sensor 120*a* in accordance with various embodiments of the disclosure. The sensor 120*b* may have substantially the same components as that shown in FIG. 2, but may differ in some details from the sensor 120*a*, as will be described. The sensor 120*a* includes one or more of sensing circuitry 121, clock circuitry 122, a counter register 123, one or more data registers 124, and interface circuitry 125.

The sensing circuitry 121 of the sensor 120*a* may be or include a MEMS element, such as a pressure sensing element, a microphone element, an inertial measurement element or other MEMS element. Sensing circuitry 121 of the sensor 120*a* may be or include photosensitive components, for example, such as would be found in a camera, a time-of-flight sensor, or the like. Generally, the MEMS element, the photosensitive components, or other sensing elements of the sensing circuitry 121 may generate one or more analog electrical signals that correspond to one or more characteristics of an environment in which the sensing elements are positioned. The one or more characteristics may include pressure, temperature, sound, light, proximal objects, or the like. The sensing circuitry 121 may include one or more analog-to-digital converters (ADCs) which, in operation, convert the analog electrical signals into digital electrical signals.

The digital electrical signals generated by the sensing circuitry 121 may be stored in the one or more data registers 124. The digital electrical signals may be stored as one or more bytes in the data registers 124. For example, the sensing circuitry 121 may periodically sense an ambient temperature, and may output respective digital electrical signals representing the ambient temperature as one or more bytes to the data registers 124.

The clock circuitry 122 may generate the sensor time stamp. The clock circuitry 122 may include an oscillator, such as a ring oscillator, a crystal oscillator, an inductive-capacitive (LC) tank, or the like. The clock circuitry 122 may include a counter coupled to the oscillator. The counter may increment based on rising and/or falling edges of the oscillator. An output of the counter may be the sensor timestamp.

The counter register 123 stores the sensor timestamp generated by the counter of the clock circuitry 122. The counter register 123 may be or include latch circuitry coupled to the counter of the clock circuitry 122. The latch circuitry may latch the output of the counter, storing the output of the counter as the sensor timestamp.

The sensor 120*a* may associate each sensor data sample in the data registers 124 with a respective sensor timestamp. For example, control circuitry of the sensor 120*a* (not specifically illustrated in FIG. 2) may cause a sensor data sample outputted by the sensing circuitry 121 and a sensor timestamp outputted by the clock circuitry 122 to be stored together in a single register of the data registers 124 or in one or more linked registers of the data registers 124. Each respective pair of a sensor data sample and a sensor timestamp may be referred to as a time stamped sensor data sample. The data registers 124 may store one or more time stamped sensor data samples. Output of the time stamped sensor data samples to the processor 110 may be performed in a first in first out (FIFO) manner, whereby earlier time stamped sensor data samples are outputted to the processor 110 before later time stamped sensor data samples.

The interface circuitry 125 may be communicatively coupled to the sensor communication interface circuitry 112 of the processor 110, the counter register 123 and the data registers 124. The time stamped sensor data samples may be outputted to the processor 110 by the interface circuitry 125. In one embodiment, the time stamped sensor data samples are packaged by the interface circuitry 125 into respective data packets prior to being outputted to the processor 110. For example, one or more start bits, stop bits, parity bits or the like may be inserted in (e.g., appended to) the time stamped sensor data samples by the interface circuitry 125 to form the respective data packets. The interface circuitry 125 may be or include an $I^2C$ communication interface and/or an SPI communication interface, for example.

Figure 3A:
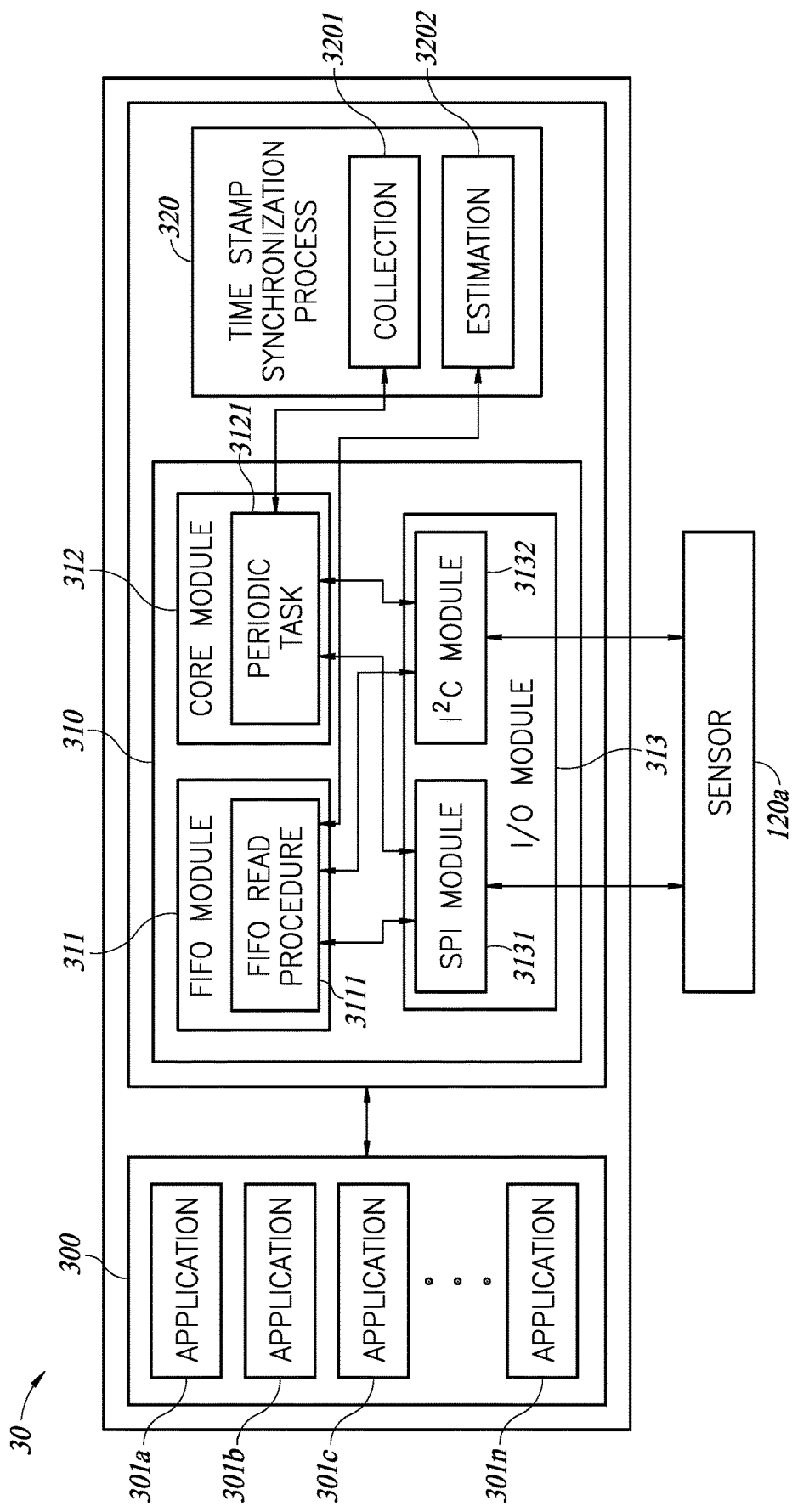
FIGS. 3A and 3B are schematic diagrams of a system architecture in accordance with various embodiments.

FIG. 3A is a diagram illustrating a system architecture 30 for generating the one or more parameters of the regression model and estimating the application timestamp based on a received sensor timestamp and the one or more parameters. The system architecture 30 may run on the processor 110, and may control one or more facets of interaction between the processor 110 and the sensors 120 (e.g., the sensor 120*a* shown in FIG. 3A). The system architecture 30 may include one or more of a user space 300 and an operating system kernel, which includes a sensor driver 310 and a timestamp synchronization process 320. The system architecture 30 may be a non-transitory computer readable medium having stored instructions thereon that, when executed by one or more processors (e.g., the processor 110), cause the one or more processors to perform one or more automated operations.

The user space 300 may include a plurality of applications 301*a*, 301*b*, 301*c*, . . . , 301*n*, which may be referred to collectively as "the applications 301." One or more of the applications 301 may be the sophisticated function described with reference to FIG. 1. For example, the application 301*a* may be an autonomous driving application of an automobile, a virtual reality application or an augmented reality application. One or more of the applications 301 may communicate with the operating system kernel to receive sensor data samples associated with respective application time stamps estimated by the processor 110. In one embodiment, the processor 110 integrates the sensor data samples to generate integrated sensor data, and one or more of the applications 301 receive the integrated sensor data from the processor 110. For example, the integrated sensor data may be a digital representation of a three-dimensional environment in which the system 10 is positioned.

The sensor driver 310 includes a FIFO module 311, a core module 312 and an interface module 313. The interface module 313 includes an SPI module 3131 and an I²C module 3132. One or more of the SPI module 3131 and the I²C module 3132 may cause the processor 110 to communicate with the sensor 120a by an SPI communication bus or an I²C communication bus, respectively.

The timestamp synchronization process 320 includes a collection task 3201 and an estimation task 3202. The collection task 3201 may cause the processor 110 to generate a plurality of data sets, each of which may include a sensor timestamp and an application timestamp. The collection task 3201 may cause the processor 110 to associate the sensor timestamp of each data set with the respective application timestamp. An example collection task 3201 is described in greater detail with reference to FIGS. 4A-4C.

The estimation task 3202 may cause the processor 110 to generate the one or more parameters of the regression model based on the plurality of data sets collected in the collection task 3201. An example estimation task 3202 is described in greater detail with reference to FIGS. 5A-5E.

The core module 312 includes a periodic task 3121. The core module 312 is in communication with the SPI module 3131 and the I²C module 3132 of the interface module 313. The periodic task 3121 of the core module 312 may run the collection task 3201 periodically to cause the processor 110 to generate the plurality of data sets periodically.

The FIFO module 311 includes a FIFO read procedure 3111. The FIFO module 311 is in communication with the SPI module 3131 and the I²C module 3132 of the interface module 313. The FIFO read procedure 3111 of the FIFO module 311 may cause the processor 110 to request a data packet including sensor sample data and associated sensor timestamp from the sensor 120a. The FIFO read procedure 3111 may run the estimation task 3202 to cause the processor 110 to generate the one or more parameters of the regression model, and estimate the application timestamp from the sensor timestamp based on the one or more parameters.

Figure 3B:
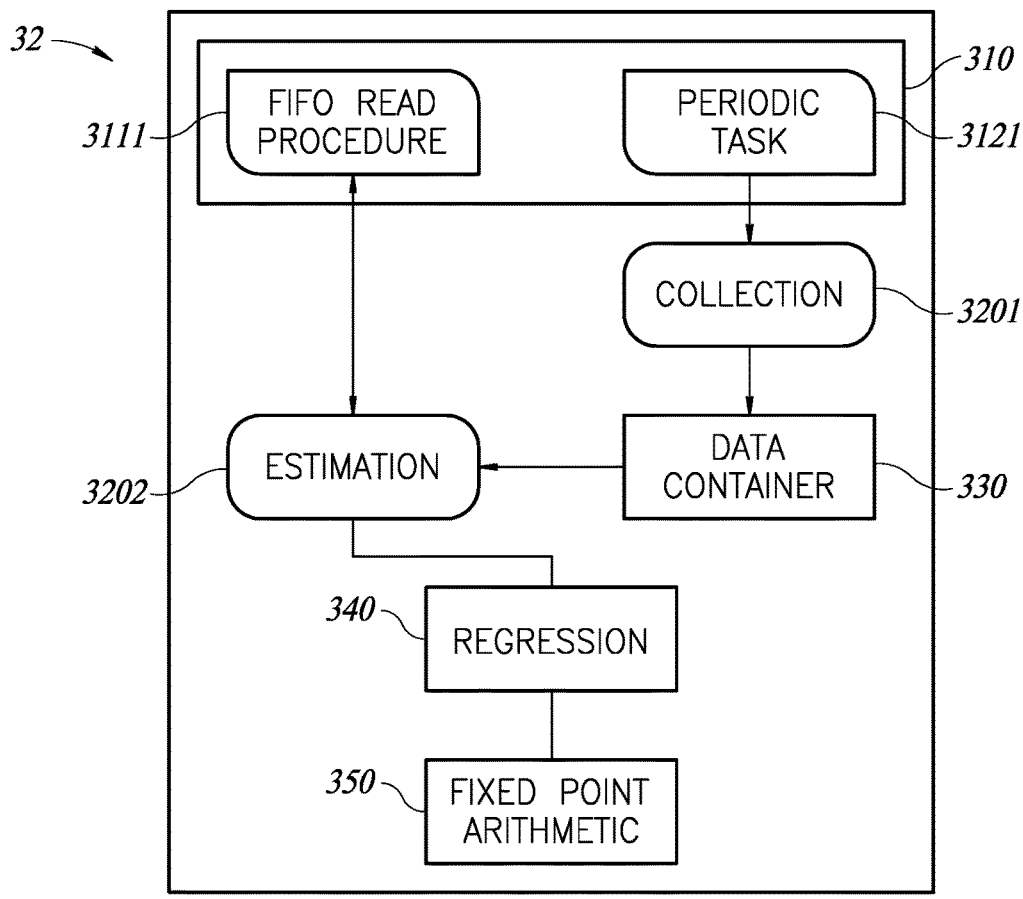

FIG. 3B is a diagram of a timestamp synchronization library 32 in accordance with various embodiments of the disclosure. The timestamp synchronization library 32 may include the collection task 3201 and the estimation task 3202. In one embodiment, each of the collection task 3201 and the estimation task 3202 is, or is associated with, a software interface. The collection task 3201 may output the plurality of data sets to a data container 330. The data container 330 may include one or more pointers to addresses in the memory 130 or in internal memory of the processor 110. In one embodiment, the data container 330 may store a plurality of data sets as tuples. For example, each tuple may include a sensor timestamp and an associated application timestamp. In one embodiment, the data container 330 may store a selected number of data sets. For example, the data container 330 may store 18 data sets. In some embodiments, the data container 330 stores more or fewer than 18 data sets. The data container 330 may be used in a FIFO manner.

The estimation task 3202 may receive a sensor timestamp and associated sensor data sample from the FIFO read procedure 3111, and may access the data container 330 to retrieve the plurality of data sets from the data container 330. Following receiving the sensor timestamp from the FIFO read procedure 3111, the estimation task 3202 may generate the one or more parameters of the regression model based on the plurality of data sets retrieved from the data container 330. Following generation of the one or more parameters of the regression model, the estimation task 3202 may estimate an application timestamp associated with the sensor timestamp received from the FIFO read procedure 3111. The estimation performed in the estimation task 3202 may be based on the one or more parameters of the regression model. As shown in FIG. 3B the estimation task 3202 may call a regression module 340, which is used to calculate the parameters (e.g., slope and intercept) of the regression model. The regression module 340 may take the plurality of data sets as input, and may output the parameters of the regression model to the estimation task 3202. As further shown in FIG. 3B, the regression module 340 may access fixed point arithmetic operations (e.g., multiplication, division, conversion) to calculate the one or more parameters of the regression model. In one embodiment, the regression model is a linear regression model. In other embodiments, other types of regression models may be used, such as a polynomial regression model, and exponential regression model, or other suitable regression model. Use of the linear regression model may reduce complexity. Calculating the one or more parameters of the regression model by fixed point arithmetic may speed up calculation of the one or more parameters, and may facilitate use in connection with various operating systems, such as Linux-based operating systems such as the Android operating system.

Figure 4A:
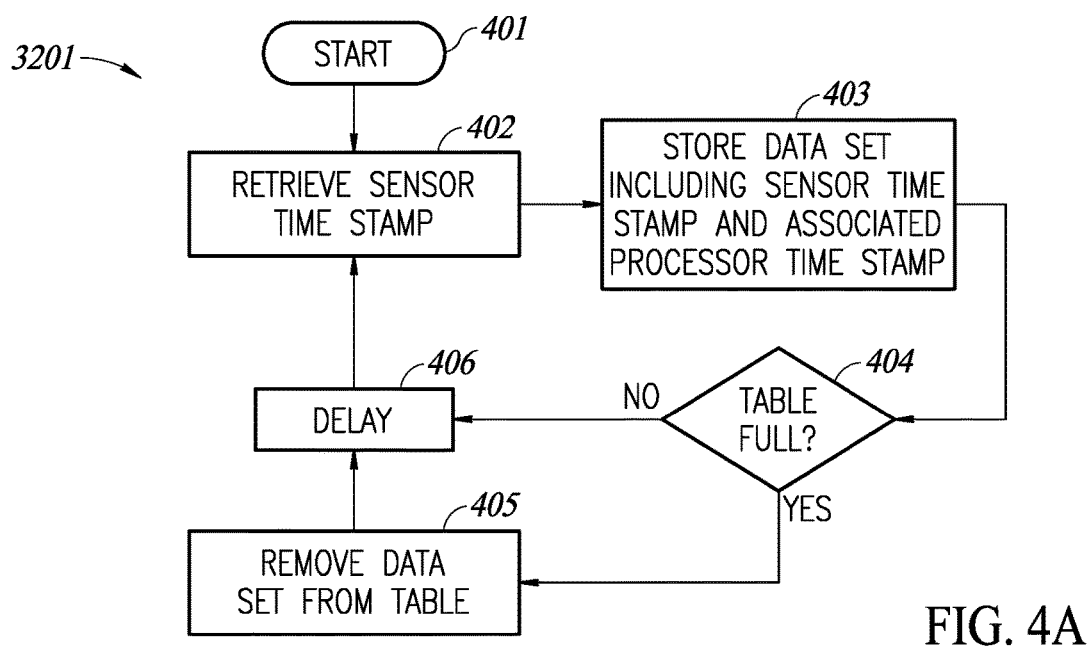
FIGS. 4A-4C are diagrams illustrating a collection task of a method in accordance with various embodiments.
Figure 4B:
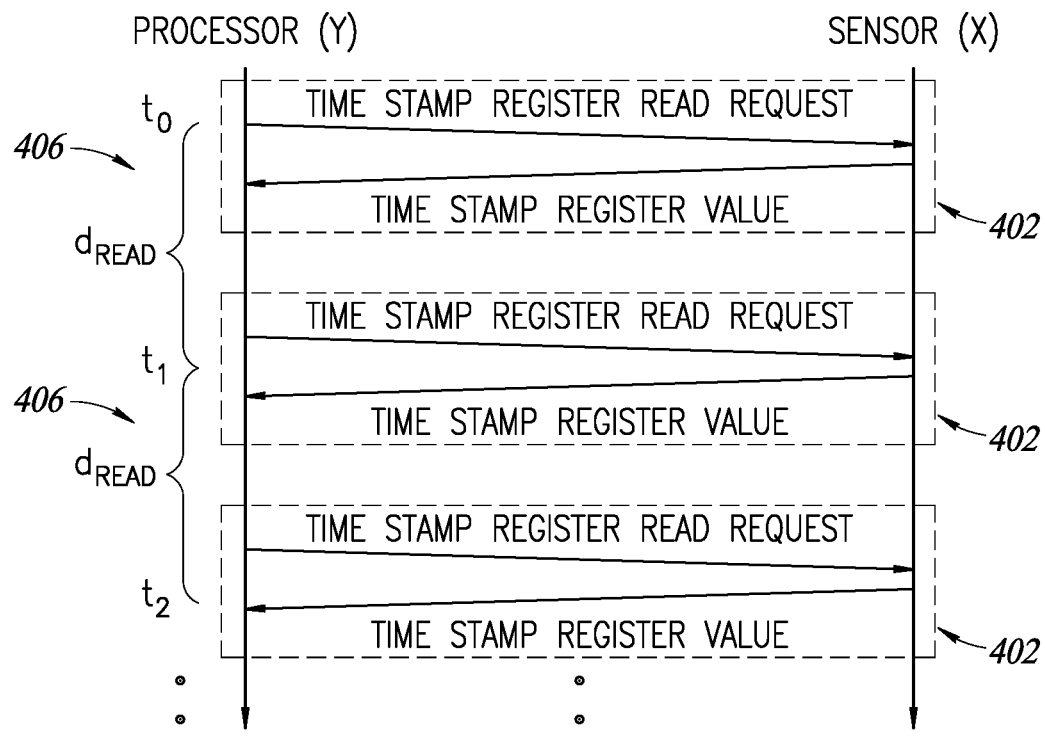

FIG. 4A illustrates a flowchart of the collection task 3201 in accordance with various embodiments of the disclosure. The collection task 3201 begins at operation 401, and in operation 402, a sensor timestamp is retrieved. The sensor timestamp may be retrieved from a register in the sensor 120a, in the memory 130, or in an external source, as described with reference to FIG. 1. An example of the processor 110 retrieving the sensor timestamp from a register in the sensor 120a is illustrated in FIG. 4B.

In operation 403, the sensor timestamp is stored in a data set with an associated processor timestamp (or "application timestamp"). The associated processor timestamp may be a timestamp generated by the processor 110 and stored in a register, for example, in internal memory of the processor 110, the memory 130, or external to the system 10. The processor timestamp associated with the sensor timestamp generally corresponds to a time close to when the processor 110 retrieves the sensor timestamp. For example, the processor timestamp may correspond to a time to (see FIG. 4B) when the processor 110 sends a request to read the register in which the sensor timestamp is stored. In another example, the processor timestamp may correspond to a time when the processor 110 receives the sensor timestamp from the register in which the sensor timestamp is stored. In yet another example, the processor 110 may calculate the processor timestamp as an average between the time when the request is sent and the time when the sensor timestamp is received. In operation 403, processor timestamp and the associated sensor timestamp are stored in a data set, which may be stored in the data container 330, which may reside in internal memory of the processor 110, the memory 130, or memory external to the system 10.

Figure 4C:
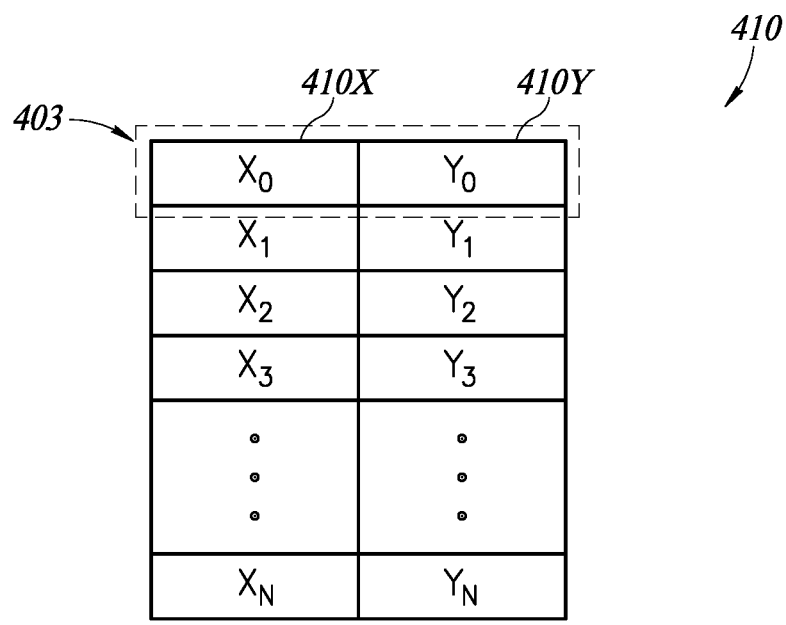

In an initial phase, the data container 330 may be initialized to zero, and may contain no data sets therein. FIG. 4C illustrates a table 410, which may be a visual representation of the data container 330. Following the initial phase, the operation 403 may record a sensor timestamp $X_0$ and a processor timestamp $Y_0$. In operation 404, the collection task 3201 checks whether the table 410 is full. When the table 410 is not full, the collection task 3201 proceeds to operation 406, which is a selected delay prior to returning to operation 402. FIG. 4B illustrates the selected delay as a delay $d_{read}$ between timestamp register read requests corresponding to operation 402. In some embodiments, the selected delay $d_{read}$ is in a range of 100 nanoseconds to 1 second, or in a range of 1 millisecond to 500 milliseconds. In one embodiment, the selected delay $d_{read}$ is about 200 milliseconds. As will be described in greater detail below, the estimation task 3202 calculates the one or more parameters of the regression model each time a data packet is received. As mentioned previously, the one or more parameters of the regression model may be calculated using fixed point arithmetic. One feature of the processor 110 is the ability to track drift between the processor timestamp in the sensor timestamp over a long period of time. Calculation of the one or more parameters includes summation, for example, of the sensor timestamps $X_0$-$X_n$ in column 410X shown in FIG. 4C. Choice of a longer selected delay $d_{read}$ corresponds to a larger range of values in the sensor time stamps $X_0$-$X_n$, which may cause a buffer overrun when performing the summation using fixed point arithmetic. Choice of a very short selected delay $d_{read}$ corresponds to a very short range of time represented by the sensor timestamps $X_0$-$X_n$, which may reduce accuracy of calculation of the one or more parameters of the regression model. As shown in FIG. 4A, the collection task 3201 may be periodic. For example, the collection task 3201 repeats, and each timestamp register read request shown in FIG. 4B is separated by the selected delay $d_{read}$.

Over time, in operation 404, all rows of the table 410 contain a data set stored in operation 403. When the table 410 is full, in operation 404, the collection task 3201 proceeds to operation 405, in which a data set is removed from the table 410. Generally the data set that is removed in operation 405 is an oldest (e.g., first) data set in the table 410. In the example illustrated in FIG. 4C, the data set including the sensor timestamp $X_0$ and the processor timestamp $Y_0$ may be removed in operation 405. Following removal of the first data set in the table 410, remaining data sets in the table 410 are shifted up, for example, by subtracting the sensor timestamp $X_0$ from each of the sensor timestamps $X_1$-$X_n$, and subtracting the processor timestamp $Y_0$ from each of the processor timestamps $Y_1$-$Y_n$.

Figure 5A:
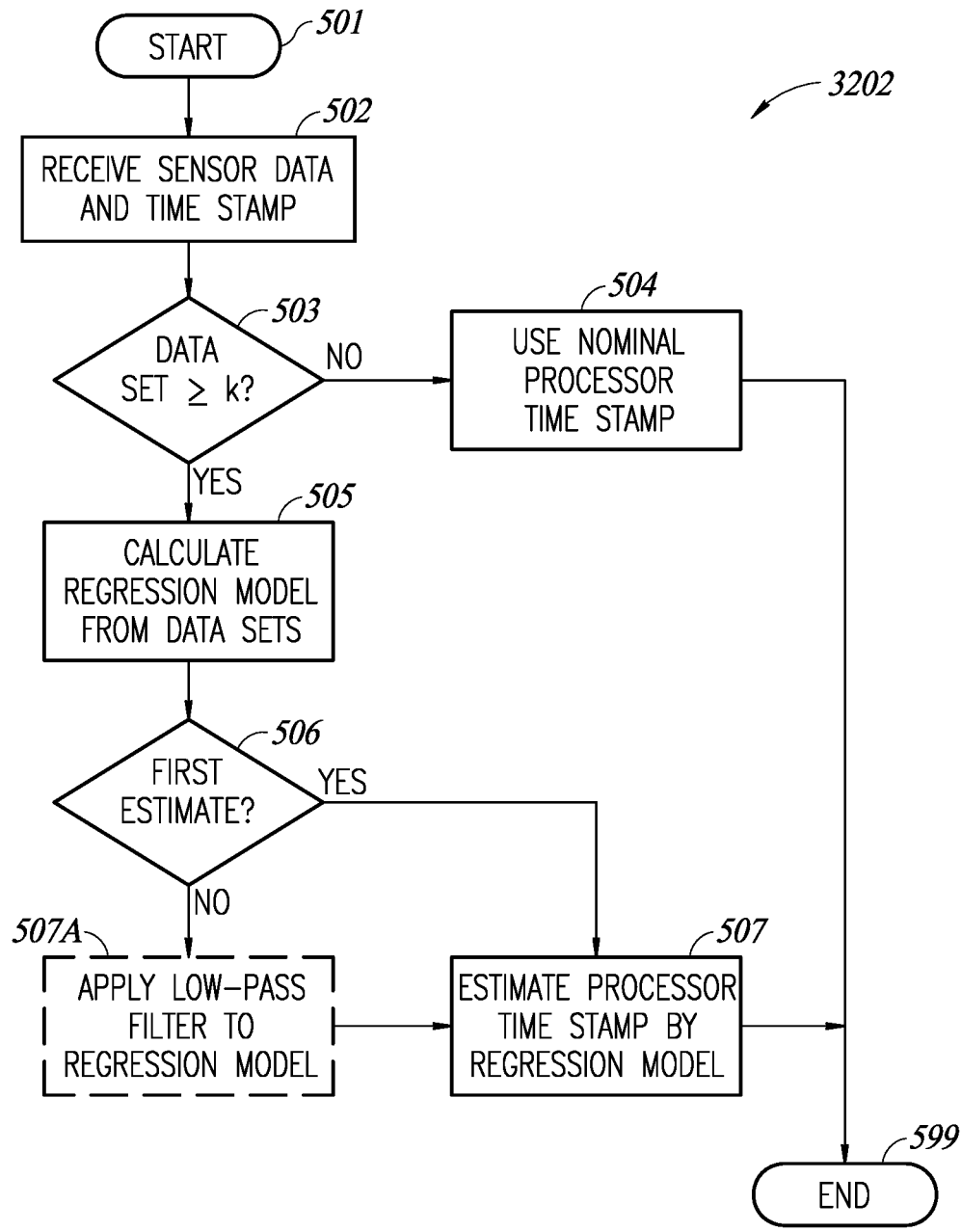
FIGS. 5A-5E are diagrams illustrating an estimation task of a method in accordance with various embodiments.
Figure 5B:
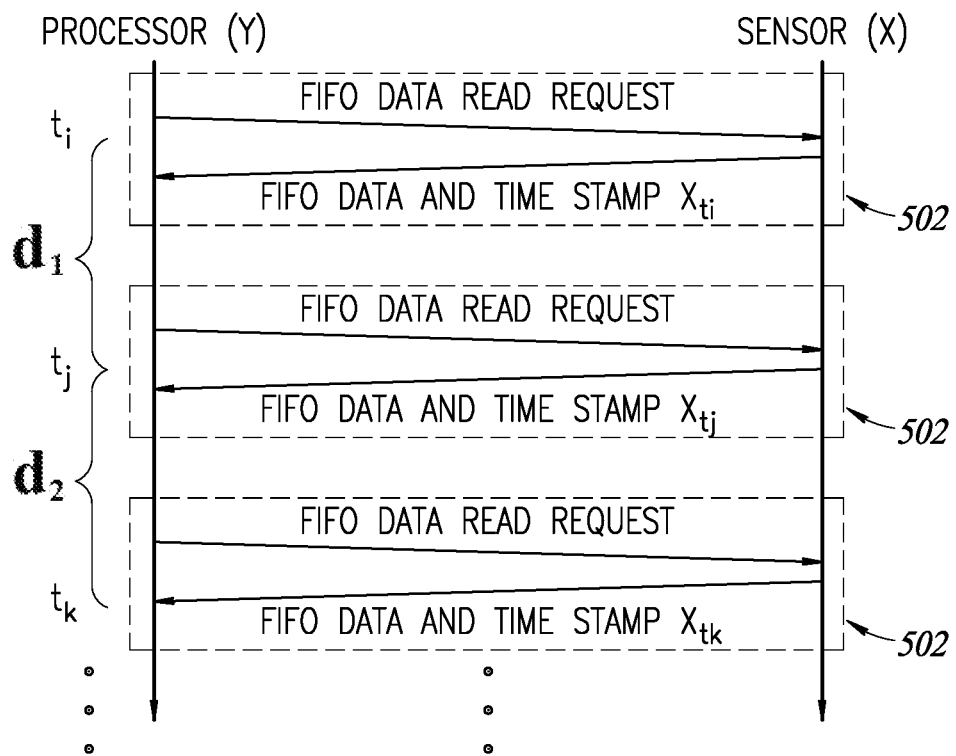

FIGS. 5A-5E illustrate the estimation task 3202 in accordance with various embodiments of the disclosure. In FIG. 5A, the estimation task 3202 begins with operation 501, followed by receiving a sensor data sample and an associated sensor timestamp in operation 502. In operation 502, the processor 110 receives the sensor data sample and the associated sensor timestamp from the sensor 120a. This is illustrated in FIG. 5B. For example, the processor 110 sends a FIFO data read request to the sensor 120a, for example, via the sensor communication interface circuitry 112 at a time $t_i$. The sensor 120a sends a data packet including the sensor data sample and the sensor timestamp $X_{ti}$. A delay $d_1$ may be present between the time $t_i$ and a subsequent time $t_j$ in which the processor 110 sends a second FIFO data read request to the sensor 120a. Another delay $d_2$ is shown between the time $t_j$ and another subsequent time $t_k$ in which the processor 110 sends a third FIFO data read request to the sensor 120a. Generally, the delay $d_1$ is different from the delay $d_2$, for example when the application 301a is suspended by the operating system (e.g., to handle a higher priority interrupt). In one embodiment, the delay $d_1$ and the delay $d_2$ are substantially the same. For example, the application 301a may send out FIFO data read requests periodically using a selected delay. The FIFO data read requests may be given a high priority, such that periodicity of executing the FIFO data read requests may be substantially guaranteed. In such cases, the delay d1 and the delay $d_2$ may be substantially the same.

In operation 503, the estimation task 3202 checks whether a number of data sets in the table 410 is greater than or equal to a selected threshold k. For example, the selected threshold k may be 3, or another number greater than 3. The selected threshold k being less than 3 may reduce accuracy of calculation of the one or more parameters of the regression model. The selected threshold k being much greater than 3 may lead to a long delay in which the processor timestamp is not estimated based on the one or more parameters of the regression model, which may lead to inaccuracy in the processor timestamp, and poor integration of the sensor data samples.

If the estimation task 3202 determines that the number of data sets in the table 410 is fewer than the selected threshold k, the estimation task 3202 may proceed to operation 504, in which a nominal processor timestamp is used. In one embodiment, the nominal processor timestamp may be a processor timestamp generated, for example, at the time $t_i$ that the processor 110 sends the FIFO data read request to the sensor 120a, shown in FIG. 5B. In another embodiment, the nominal processor timestamp may be a processor timestamp set to be substantially equal to the sensor timestamp received in operation 502. For example, setting the processor timestamp to be substantially equal to the sensor timestamp may be similar to estimating the processor timestamp using a slope of one and an intercept of zero.

If the estimation task 3202 determines that the number of data sets in the table 410 is greater than or equal to the selected threshold k, the estimation task 3202 may proceed to operation 505, in which the estimation task 3202 causes the processor 110 (e.g., the processing circuitry 111) to calculate the one or more parameters of the regression model based on the data sets in the table 410. In one embodiment, the regression model is a linear regression model, and the one or more parameters include a slope "a" and an intercept "b," as described with reference to FIG. 1. The slope a and the intercept b may be calculated, for example, according to:

$$a = \frac{n(\sum xy) - (\sum x)(\sum y)}{n(\sum x^2) - (\sum x)^2}$$

$$b = \frac{(\sum y)(\sum x^2) - (\sum x)(\sum xy)}{n(\sum x^2) - (\sum x)^2}$$

where "x" is a respective sensor timestamp, "y" is a respective processor timestamp, and "n" is number of data sets used in the calculation. Calculating the slope a and the intercept b using the above equations may be by fixed point arithmetic. In one embodiment, shown in FIG. 5E, calculating the one or more parameters of the regression model may include use of computational windows 520. Use of computational windows (or "windowing") allows usage of timestamp synchronization process 320 in systems that do not include, or do not have access to, floating point arithmetic circuitry (e.g., systems where fixed point arithmetic is used).

Following calculation of the one or more parameters of the regression model in operation 505, the estimation task 3202 determines, in operation 506, whether this is the first time estimating the processor timestamp from the sensor timestamp using the one or more parameters of the regression model. If so, the estimation task 3202 causes the processor 110 to estimate the processor time stamp, in operation 507, based on the one or more parameters. For the linear regression model in which the parameters include the slope a and the intercept b, the processor time stamp may be estimated by the equation $Y_{ti}=aX_{ti}+b$.

Figure 5C:
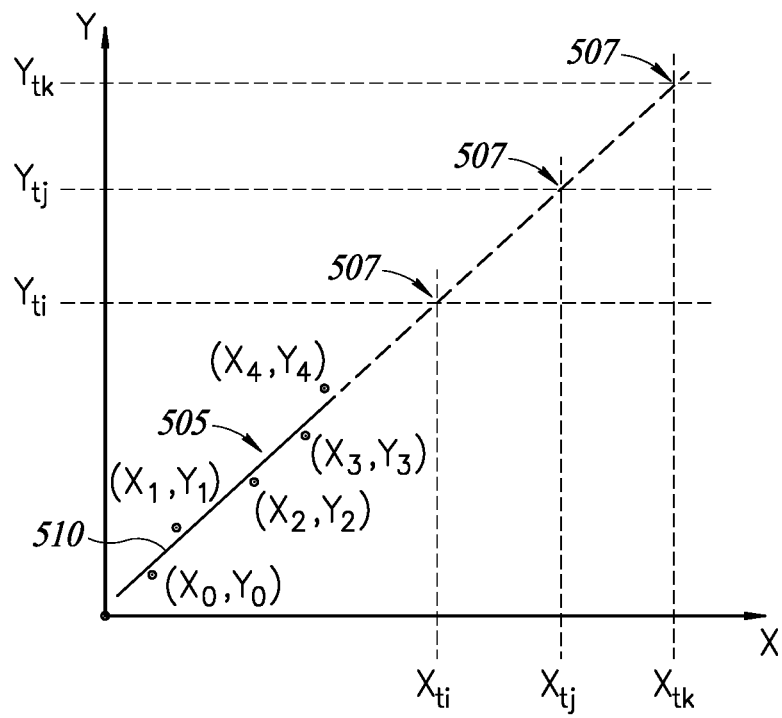

FIG. 5C illustrates the operation 505, in which a regression line 510 is shown, which represents the one or more parameters of the regression model calculated based on five data sets $(X_0,Y_0)$, $(X_1,Y_1)$, $(X_2,Y_2)$, $(X_3,Y_3)$, $(X_4,Y_4)$. A dotted line in FIG. 5C is an extension of the regression line 510. FIG. 5C also illustrates the operation 507, in which processor time stamps $Y_{ti}$, $Y_{tj}$, $Y_{tk}$ are estimated based on sensor time stamps $X_{ti}$, $X_{tj}$, $X_{tk}$, respectively.

In FIG. 5A, when the estimation task 3202 determines, in operation 506, that this is not the first estimate of the processor time stamp using the one or more parameters of the regression model, the estimation task 3202 may perform optional operation 507A prior to performing operation 507. In optional operation 507A, the one or more parameters of the regression model are smoothed. For example, a low-pass filter may be applied to smooth the one or more parameters of the regression model. In one embodiment, the low-pass filter is applied when the table 410 is full. In one embodiment, the low-pass filter is applied after the first time the one or more parameters of the regression model have been calculated (e.g., the second time, third time, hundred time, or the like). Applying a smoother, such as a low-pass filter, may remove spurious data sets from the table 410, and improve accuracy when generating the one or more parameters of the regression model. For example, as data sets are added to the table 410, the one or more parameters of the regression model are updated. If a data set is too far outside the model prediction, the data set may not be used to update the model, for example, by removing the data set by the low-pass filter. As such, smoothing (e.g., filtering) the data sets of the table 410 may result in more accurate generation, or smoothing, of the one or more parameters of the regression model.

Figure 5D:
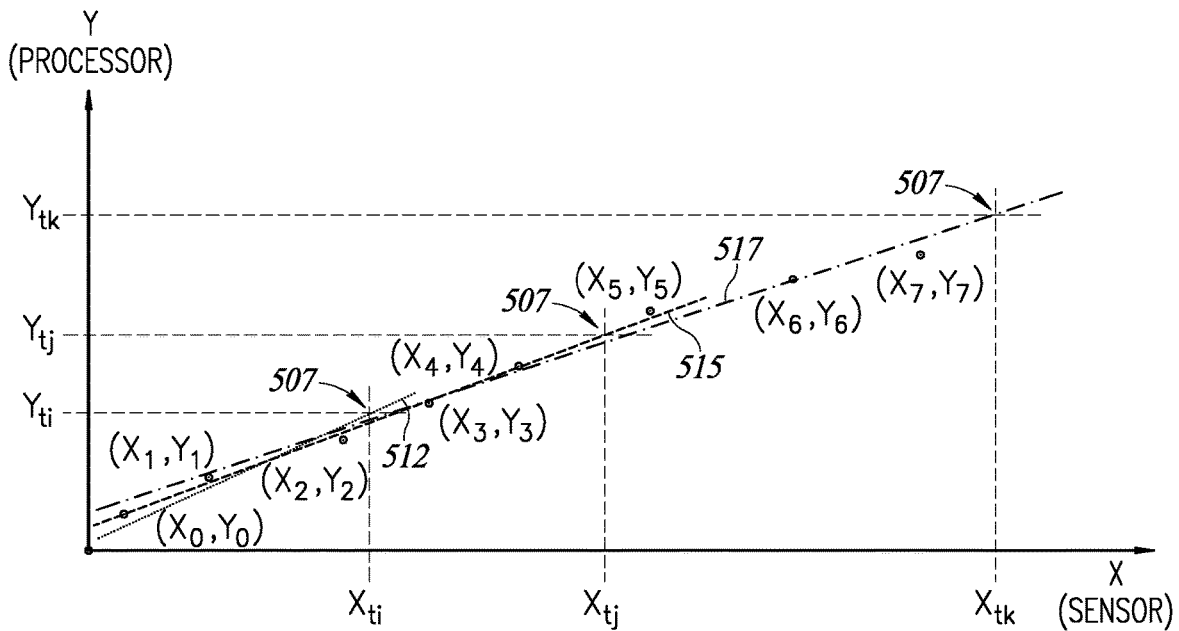
Figure 5E:
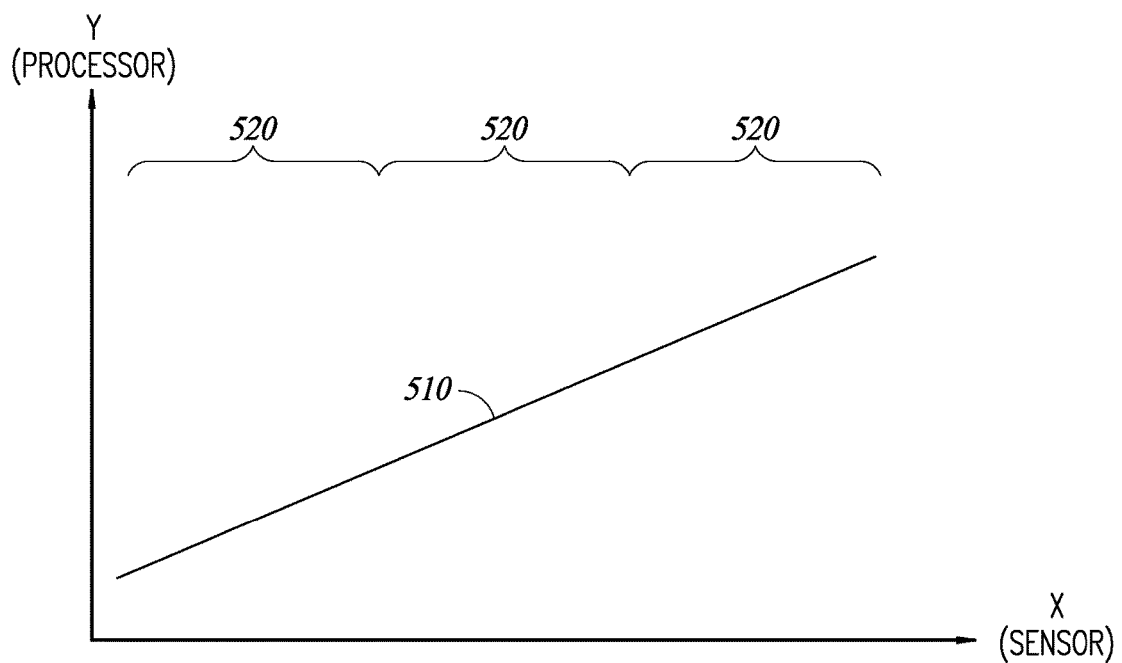

FIG. 5D illustrates updating of the one or more parameters of the regression model over time. A regression line 512, shown in FIG. 5D by a finely dotted line, corresponds to the operation 505 performed when the table 410 includes the data sets $(X_0, Y_0)$, $(X_1, Y_1)$ $(X_2, Y_2)$. The one or more parameters illustrated by the regression line 512 may be generated when the processor 110 receives the sensor timestamp $X_{ti}$. Based on the one or more parameters illustrated by the regression line 512, the processor 110 may estimate the processor timestamp $Y_{ti}$, as shown. When the processor 110 receives the sensor timestamp $X_{tj}$ following the FIFO data read request sent at the time $t_j$ shown in FIG. 5B, the processor 110 generates the one or more parameters illustrated by a regression line 515 based on the data sets $(X_0, Y_0)$, $(X_1, Y_1)$, $(X_2, Y_2)$, $(X_3, Y_3)$, $(X_4, Y_4)$. The processor 110 may estimate the processor timestamp $Y_{tj}$ based on the one or more parameters illustrated by the regression line 515 and the sensor time stamp $X_{tj}$. When the processor 110 receives the sensor timestamp $X_{tk}$ following the FIFO data read request sent at the time $t_k$ shown in FIG. 5B, the processor 110 generates the one or more parameters illustrated by a regression line 517 based on the data sets $(X_0, Y_0)$, $(X_1, Y_1)$, $(X_2, Y_2)$, $(X_3, Y_3)$, $(X_4, Y_4)$, $(X_5, Y_5)$, $(X_6, Y_6)$, $(X_7, Y_7)$. The processor 110 may estimate the processor timestamp $Y_{tk}$ based on the one or more parameters illustrated by the regression line 517 and the sensor time stamp $X_{tk}$.

Figure 6:
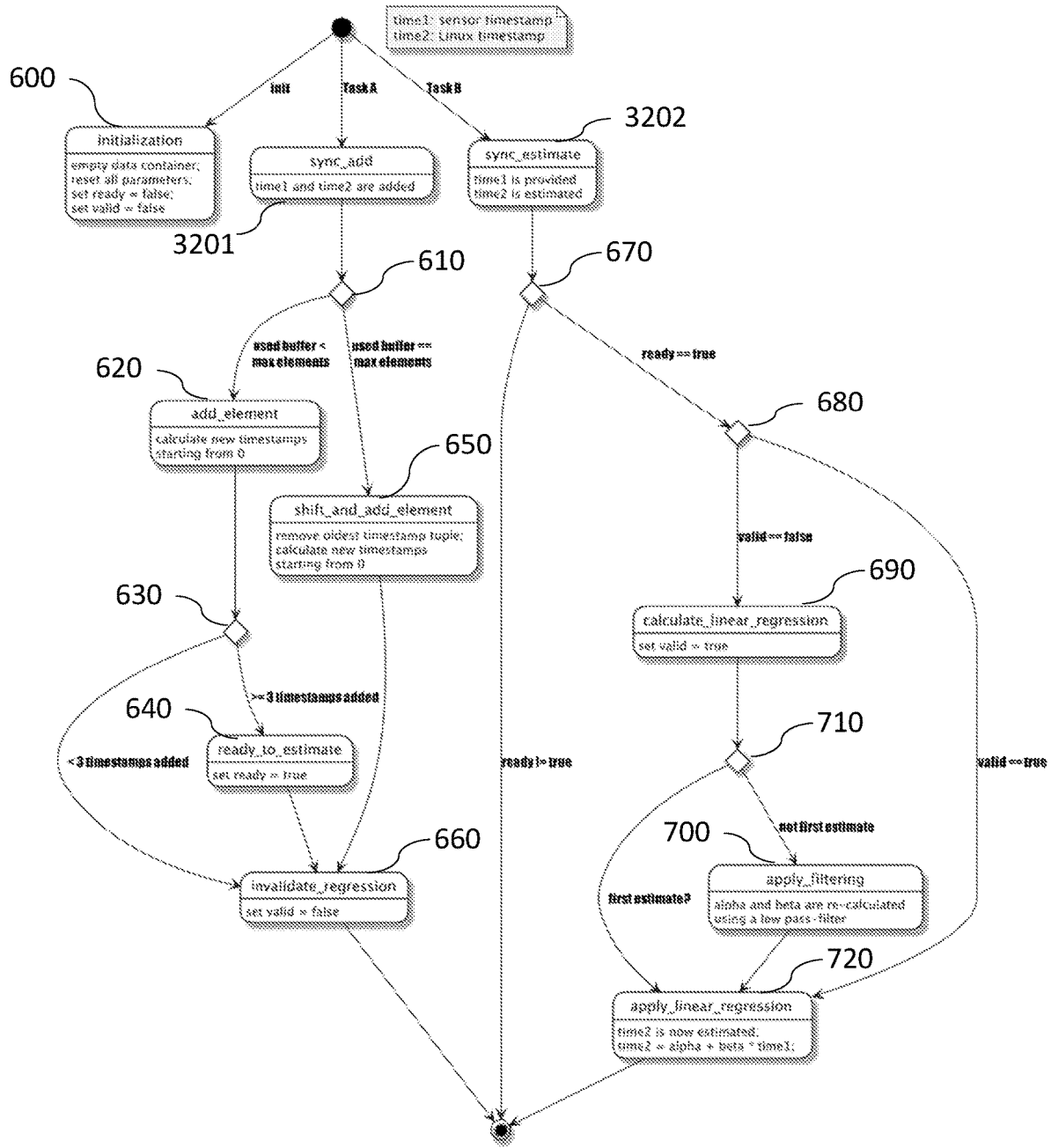
FIG. 6 is a state diagram of a method in accordance with various embodiments.

FIG. 6 is a state diagram illustrating a method of synchronizing an application time stamp with a sensor time stamp, in accordance with various embodiments of the disclosure. The state diagram shown in FIG. 6 is similar in many respects to the flowcharts illustrated in FIGS. 4A, 5A, so repeated description of similar elements and/or interactions therebetween may be omitted for brevity.

In FIG. 6, an initialization operation 600 is performed to initialize various registers and/or parameters to be used when the collection task 3201 and/or the estimation task 3202 are performed. In one embodiment, a data container (such as the data container 330) is emptied in the initialization operation 600. For example, elements of the data container may be set to "0" or void. In one embodiment, the one or more parameters of the regression model are reset. For example, the slope may be set to 1, and the intercept may be set to 0. Other values, such as void, may also be used when resetting the one or more parameters. In one embodiment, a first variable "ready" and a second variable "valid" may be initialized, e.g., to "false." The first variable may be referred to as the "ready variable," and the second variable may be referred to as the "valid variable."

Following initialization in the initialization operation 600, the collection task 3201, the estimation task 3202, or both may be run, e.g., sequentially or in parallel. A first time variable "time1" and a second time variable "time2" may correspond to a sensor time stamp and an operating system (e.g., Linux) time stamp, respectively. In the collection task 3201, a sensor time stamp and an operating system time stamp (or, "application time stamp") are added, for example, to the data container 330 (e.g., the table 410). The sensor time stamp and the operating system time stamp may be collectively referred to as a data set. The data set may be added to the data container 330 (or, "buffer") directly when empty space(s) is present in the data container 330, corresponding to operation 620. This is illustrated in FIG. 6 as "used buffer<max elements." When the data container 330 is full (e.g., "used buffer=max elements"), the data set may be added by operation 650. In operation 650, labeled "shift_and_add_element," an oldest data set stored in the data container 330 may be removed, other data sets stored in the data container 330 may be shifted up, and the data set to be added may be stored in the empty space at the end of the data container 330. The processor 110 may determine whether to store the data container 330 using operation 620 or operation 650 in operation 610.

When the data set is stored in the data container 330 using operation 620 (e.g., when the data container 330 is not full), the first (e.g., the oldest) processor time stamp in the data container 330 may be set to have a value of "0." When the data set is stored in the data container 330 using operation 650 (e.g., when the data container 330 is full), when the other data sets stored in the data container 330 are shifted up, the now oldest processor time stamp in the data container 330 may be reset to 0, and each of the remaining processor time stamps may be shifted in value, for example, by subtracting the original value of the now oldest processor time stamp from each of the remaining processor time stamps. A similar shifting of value may be performed on the sensor time stamps. Setting the first (e.g., oldest) processor and sensor time stamps in the data container 330 to "0" may prevent buffer overruns when using fixed point arithmetic to estimate the one or more parameters of the regression model. For example, if the values of the older processor and sensor time stamps were allowed to keep their original value, over time, the values of the processor and sensor time stamps in the data container 330 would become very large. When calculating the slope and intercept as described with reference to operation 505 above, the sensor time stamps are multiplied by the processor time stamps, the sensor time stamps are squared, and the processor time stamps are squared. As such, the fixed point arithmetic may fail or output an erroneous result if the values of the processor and sensor time stamps are allowed to become very large. Shifting the values of the processor and sensor time stamps as each new data set comes in prevents such errors when using fixed point arithmetic to generate the one or more parameters of the regression model. Each shift and add operation performed in operation 650 may correspond to a single computational window 520 (e.g., a moving window).

Following adding the data set in operation 620, in operation 630, if a selected number (e.g., 3) of data sets have been added, the method proceeds to operation 640, in which the ready variable is set to "true," which may indicate that a sufficient number of data sets are stored to generate the one or more parameters of the regression model. Following operation 640, an operation 660 is performed, in which the valid variable is set to "false," which corresponds to invalidating the one or more parameters of the regression model (even if the one or more parameters have not been calculated yet). If fewer than the selected number of data sets have been added, the ready variable may remain unchanged (e.g., may be "false"), indicating that an insufficient number of data sets are stored, and the one or more parameters of the regression model may not be generated. Operation 660 also follows operation 630 when fewer than the selected number of data sets have been added.

Following adding the data set and shifting the remaining data sets in the data container in operation 650, the valid variable is set to "false." Following initialization, when the estimation task 3202 has not been run, the valid variable is already set to "false." When the estimation task 3202 has been run, and the one or more parameters of the regression model have been generated (e.g., in operation 690), by setting the valid variable to "false," the one or more parameters will be generated (e.g., recalculated) the next time the estimation task 3202 is run.

When the estimation task 3202 (labeled "sync_estimate") is run, the sensor time stamp is provided (e.g., received following a FIFO data read request) and the operating system time stamp is to be estimated. In operation 670, if the ready variable is "false," the estimation task 3202 may end without estimating the operating system time stamp. In one embodiment, as described with reference to operation 504 of FIG. 5A, a nominal operating system time stamp may be used when the ready variable is "false" when the estimation task 3202 is run. If the ready variable is "true," the method proceeds to operation 680.

In operation 680, if the valid variable is "false," the one or more parameters of the regression model are calculated in operation 690, and the valid variable is set to "true." In operation 680, the valid variable being "false" may indicate that the one or more parameters of the regression model have not been calculated previously. The valid variable being "false" may indicate that a new data set has been added in the collection task 3201, such that the one or more parameters of the regression model are obsolete, and new one or more parameters of the regression model are to be generated. For example, the estimation task 3202 may be performed multiple times between generating the one or more parameters of the regression model and receiving a new data set that obsoletes the regression model. As such, the one or more parameters of the regression model may not be generated (e.g., recalculated) every time the processor 110 receives a sensor data sample and associated sensor time stamp (e.g., "time1").

In operation 680, when the valid variable is "true," the method may proceed to operation 720. In operation 720, because the one or more parameters of the regression model have been calculated in operation 690, and the collection task 3201 has not been updated in the interim, the regression model is applied to estimate the operating system time stamp. In operation 720, the one or more parameters may be used to estimate the operating system time stamp (e.g., as labeled "time2=alpha+beta*time1").

In the operation 690, the one or more parameters of the regression model are generated, which may be similar to operation 505 of FIG. 5A. Following generation of the one or more parameters of the regression model in operation 690, the valid variable may be set to "true," which may indicate that the one or more parameters of the regression model are valid (e.g., may be used to estimate the operating system time stamp from the sensor time stamp).

In operation 710, when the estimation task 3202 is estimating the operating system time stamp for the first time, the operation 710 branches to operation 720, in which the operating system time stamp is estimated, for example, by using the one or more parameters of the regression model. The operating system time stamp may be estimated by calculating the sum of the intercept ("beta") and the product of the slope ("alpha") and the sensor time stamp (e.g., as labeled "time2=alpha+beta*time1"). In one embodiment, the intercept is not generated, and the operating system time stamp is estimated based on the slope and the sensor time stamp (e.g., time2=beta*time1).

In operation 710, when the estimation task 3202 is not estimating the operating system time stamp for the first time (e.g., it is the second time, third time or hundredth time), the operation 710 branches first to the operation 700 before the operation 720 is performed. In the operation 700, a filter is applied to generate (e.g., recalculate) the one or more parameters of the regression model. For example, as described with reference to optional operation 507A of FIG. 5A, the filter may be applied to remove spurious data sets in the data container 330 from consideration when generating (e.g., calculating) the one or more parameters of the regression model. Following generation of the one or more parameters of the regression model using filtering (e.g., low-pass filtering) in operation 700, the operating system time stamp is estimated in operation 720.

FIG. 4A illustrates a flowchart of the collection task 3201 in accordance with various embodiments of the disclosure. FIG. 5A illustrates a flowchart of the estimation task 3201 in accordance with various embodiments of the disclosure. FIG. 6 illustrates a state diagram of a method in accordance with various embodiments of the disclosure. Various acts are illustrated in FIGS. 4A, 5A, 6. Additional acts, fewer acts, combined acts, separated acts, or different orders of acts may be performed in some embodiments. For example, in some embodiments, the one or more parameters of the regression model may be updated periodically instead of each time a new sample/sensor time data set is processed.

Embodiments may provide advantages. One or more parameters of a regression model are generated for estimating the application time stamp from the sensor time stamp. By updating the one or more parameters of the regression model periodically, integration of the sensor data samples may be more sustained and accurate, and performance of the sophisticated function is improved.

In an embodiment, a device includes a sensor associated with a sensor time domain, and a processor coupled to the sensor. The sensor generates a data sample, generates a sensor time stamp associated with the sensor time domain, and associates the data sample with the sensor time stamp. The processor receives the data sample and the sensor time stamp from the sensor, and estimates, based on one or more parameters of a regression model and based on the sensor time stamp, an application time stamp associated with an application time domain.

In one embodiment, a method includes generating one or more parameters of a regression model based on a plurality of data sets. Each of the plurality of data sets includes a respective first application time stamp and a respective first sensor time stamp. A second application time stamp associated with a received sensor data sample is estimated based on the one or more parameters. The received sensor data sample has an associated second sensor time stamp.

In one embodiment, a system includes a plurality of sensors. Each of the plurality of sensors is associated with a respective sensor time domain. A processor is coupled to the plurality of sensors. The processor generates one or more parameters of a regression model based on a plurality of data sets. Each data set includes an application time stamp and a sensor time stamp. The processor estimates, based on the one or more parameters, application time stamps associated with received sensor data samples. The received sensor data samples have associated sensor time stamps.

In one embodiment, a non-transitory computer-readable medium has stored instructions thereon. When executed by one or more processors, the stored instructions cause the one or more processors to perform one or more automated operations. The automated operations include generating one or more parameters of a regression model based on a plurality of data sets. Each of the plurality of data sets including a respective first application time stamp and a respective first sensor time stamp. The automated operations include estimating, based on the one or more parameters, a second application time stamp associated with a received sensor data sample. The received sensor data sample has an associated second sensor time stamp.

In one embodiment, a device includes processing circuitry and sensor communication interface circuitry. The processing circuitry, in operation: generates one or more parameters of a regression model based on a plurality of data sets, each data set including an application time stamp and a sensor time stamp; and estimates, based on the one or more parameters, application time stamps associated with received sensor data samples, the received sensor data samples having associated sensor time stamps. The sensor communication interface circuitry is coupled to the processing circuitry. The sensor communication interface circuitry, in operation, communicatively couples the processing circuitry to a sensor, data samples of the sensor being received by the processor via the sensor communication interface circuitry.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
processing circuitry, wherein the processing circuitry, in operation:
generates, using fixed point arithmetic and computational windows that correspond to shift and add operations applied to a plurality of data sets, one or more parameters of a regression model based on the plurality of data sets, each data set including an application time stamp and a sensor time stamp; and
estimates, based on the one or more parameters, application time stamps associated with received sensor data samples, the received sensor data samples having associated sensor time stamps; and
sensor communication interface circuitry coupled to the processing circuitry, wherein the sensor communication interface circuitry, in operation, communicatively couples the processing circuitry to a sensor, data samples of the sensor being received by the processing circuitry via the sensor communication interface circuitry.

2. The device of claim 1, wherein the regression model is a linear regression model.

3. The device of claim 2, wherein the processing circuitry, in operation, generates the one or more parameters in each computational window.

4. The device of claim 1, wherein the processing circuitry, in operation:
reads a plurality of sensor time stamps generated by the sensor; and
generates, based on the plurality of sensor time stamps, the one or more parameters of the regression model.

5. The device of claim 4, wherein the processing circuitry, in operation:
associates each of the plurality of sensor times stamps with a respective application time stamp.

6. The device of claim 4, including:
a memory interface, which, in operation communicatively couples the processing circuitry to memory, wherein the plurality of sensor time stamps are read by the processing circuitry via the memory interface.

7. The device of claim 1, wherein the processing circuitry, in operation:
receives a plurality of data samples generated by respective sensors; and
synchronizes, based on estimated application time stamps associated with the plurality of data samples, the plurality of data samples.

8. The device of claim 1, wherein the processing circuitry, in operation:
uses a low-pass filter to generate the one or more parameters of the regression model.

9. A method, comprising:
generating, using fixed point arithmetic and computational windows, one or more parameters of a regression model based on a plurality of data sets, each of the plurality of data sets including a respective first application time stamp and a respective first sensor time stamp, wherein the computational windows correspond to shift and add operations applied to the plurality of data sets; and
estimating, based on the one or more parameters, a second application time stamp associated with a received sensor data sample, the received sensor data sample having an associated second sensor time stamp.

10. The method of claim 9, including:
generating the plurality of data sets, the generating a data set of the plurality of data sets including:
receiving a sensor time stamp of the data set by reading a register of a sensor; and
associating the sensor time stamp of the data set with an application time stamp.

11. The method of claim 10, wherein the generating the plurality of data sets is asynchronous and periodic.

12. The method of claim 10, wherein the generating the plurality of data sets includes:
  removing one of the plurality of data sets associated with a first time; and
  adding a data set associated with a second time, the second time being later than the first time.

13. A system, comprising:
  a plurality of sensors, each of the plurality of sensors associated with a respective sensor time domain; and
  a processor coupled to the plurality of sensors, wherein the processor, in operation:
  generates, using fixed point arithmetic and computational windows, one or more parameters of a regression model based on a plurality of data sets, each data set including an application time stamp and a sensor time stamp, wherein the computational windows correspond to shift and add operations applied to the plurality of data sets; and
  estimates, based on the one or more parameters, application time stamps associated with received sensor data samples, the received sensor data samples having associated sensor time stamps.

14. The system of claim 13, including:
  a communication interface, which, in operation, communicatively couples one or more of the plurality of sensors to the processor, wherein data samples of one or more of the plurality of sensors are received by the processor via the communication interface.

15. The system of claim 13, wherein the regression model is a linear regression model.

16. The system of claim 13, wherein the processor, in operation, generates the one or more parameters in each computational window.

17. The system of claim 13, wherein the processor, in operation:
  reads a plurality of sensor time stamps generated by the sensor; and
  generates, based on the plurality of sensor time stamps, the one or more parameters of the regression model.

18. The system of claim 13, wherein the processor, in operation:
  receives a plurality of data samples generated by respective sensors; and
  synchronizes, based on estimated application time stamps associated with the plurality of data samples, the plurality of data samples.

19. A non-transitory computer-readable medium having stored instructions thereon that, when executed by one or more processors, cause the one or more processors to perform one or more automated operations, the automated operations comprising:
  generating, using fixed point arithmetic and computational windows, one or more parameters of a linear regression model based on a plurality of data sets, each of the plurality of data sets including a respective first application time stamp and a respective first sensor time stamp, wherein the computational windows correspond to shift and add operations applied to the plurality of data sets; and
  estimating, based on the one or more parameters, a second application time stamp associated with a received sensor data sample, the received sensor data sample having an associated second sensor time stamp.

20. The non-transitory computer-readable medium of claim 19, wherein the one or more parameters of the regression model are generated using a low-pass filter.

21. The non-transitory computer-readable medium of claim 19, wherein the automated operations include:
  generating the plurality of data sets, the generating a data set of the plurality of data sets including:
  receiving a sensor time stamp of the data set by reading a register of a sensor; and
  associating the sensor time stamp of the data set with an application time stamp.

22. A system, comprising:
  a sensor associated with a sensor time domain, wherein the sensor, in operation:
  generates a data sample;
  generates a sensor time stamp associated with the sensor time domain; and
  associates the data sample with the sensor time stamp; and
  a processor coupled to the sensor, wherein the processor, in operation:
  receives, from the sensor, the data sample and the sensor time stamp; and
  generates, using fixed point arithmetic and computational windows that correspond to shift and add operations applied to a plurality of data sets, one or more parameters of a regression model; and
  estimates, based on the one or more parameters of the regression model and based on the sensor time stamp, an application time stamp associated with an application time domain.

23. The system of claim 22, wherein the processor, in operation:
  generates the one or more parameters of the regression model based on a plurality of data sets, each of the plurality of data sets including a respective sensor time stamp and a respective application time stamp.

24. The system of claim 22, wherein the regression model is a linear regression model.

25. The system of claim 24, wherein the one or more parameters are calculated once in each computational window.

26. The system of claim 22, wherein the processor, in operation:
  reads a plurality of sensor time stamps generated by the sensor; and
  generates, based on the plurality of sensor time stamps, the one or more parameters of the regression model.

27. The system of claim 26, including:
  a communication interface, which, in operation communicatively couples the sensor to the processor, wherein data samples of the sensor are received by the processor via the communication interface.

28. The system of claim 22, wherein the processor, in operation:
  integrates, based on the application time stamp, the data sample and other data samples, each of the other data samples being generated by a respective other sensor.

29. The system of claim 22, wherein the processor, in operation:
  uses a low-pass filter to generate the one or more parameters of the regression model.

* * * * *